(12) United States Patent
Heo (10) Patent No.: US 12,466,465 B2
(45) Date of Patent: Nov. 11, 2025

(54) STEER BY WIRE TYPE STEERING APPARATUS

(71) Applicant: HL MANDO CORPORATION, Gyeonggi-do (KR)

(72) Inventor: Seong Moo Heo, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 461 days.

(21) Appl. No.: 18/110,921

(22) Filed: Feb. 17, 2023

(65) Prior Publication Data

US 2023/0365185 A1 Nov. 16, 2023

(30) Foreign Application Priority Data

May 13, 2022 (KR) .................. 10-2022-0058893

(51) Int. Cl.
*B62D 5/00* (2006.01)
*B62D 5/04* (2006.01)

(52) U.S. Cl.
CPC ........... *B62D 5/001* (2013.01); *B62D 5/0403* (2013.01)

(58) Field of Classification Search
CPC ..................................................... B62D 5/001
See application file for complete search history.

(56) References Cited

U.S. PATENT DOCUMENTS

| 11,904,957 B2 * | 2/2024 | Heo | ......................... F16H 19/02 |
| 2022/0185364 A1 * | 6/2022 | Kwon | .................. B62D 5/0406 |
| 2022/0379949 A1 * | 12/2022 | Cho | ......................... B62D 5/001 |

\* cited by examiner

*Primary Examiner* — Kevin Hurley
(74) *Attorney, Agent, or Firm* — WOMBLE BOND DICKINSON (US) LLP

(57) ABSTRACT

A steer by wire type steering apparatus comprises an input shaft having one end coupled to a reducer and having an input gear formed on an outer circumferential surface of another end to transmit driving force of a motor, an output shaft having an output gear coupled to the input gear formed on one side of an outer circumferential surface, a first gear coupled to one end, and a pitman arm coupled to another end, a sensor shaft having one end coupled to a second gear coupled to the first gear, and an angle sensor coupled to an outer circumferential surface of the sensor shaft to detect a rotational angle of the sensor shaft and transmit the rotational angle of the sensor shaft to an electronic control device.

20 Claims, 11 Drawing Sheets

STEER BY WIRE TYPE STEERING APPARATUS

CROSS REFERENCE TO RELATED APPLICATION

This application claims the benefit and priority from Korean Patent Application No. 10-2022-0058893, filed in the Republic of Korea on May 13, 2022, the entire contents of which are hereby incorporated by reference for all purposes as if fully set forth into the present application.

BACKGROUND

Technical Field

Embodiments of the present disclosure relate to a steer by wire type steering apparatus, and more particularly, to a steer by wire type steering apparatus that can increase the steering feel and steering stability of the driver by accurately measuring the rotation angle of the road wheel to ensure precise steering control and to reduce the error in measuring the rotation angle of the road wheel even in the state of durability.

Description of the Related Art

In general, power steering has been developed and applied to a vehicle steering apparatus to provide convenience in driving operation by assisting a driver's operating force of a steering wheel. Power steering was developed and applied in hydraulic type using hydraulic pressure, electro-hydraulic type using hydraulic pressure and electric power of the motor at the same time, and electric type using only electric power of the motor.

Recently, instead of removing a mechanical connection device such as a steering column or a universal joint or a pinion shaft between the steering wheel and the vehicle wheel, the Steer By Wire (SBW) type steering apparatus for steering a vehicle using an electric motor has been developed and applied.

However, in the case of such a steer by wire type steering system, since there is no mechanical connection between the steering shaft and the vehicle wheels, an error is generated between the actual rotation angle of the road wheel and the rotation angle of the driver's steering wheel, thereby degrading the driver's steering feeling and steering stability.

In addition, as the durability of the vehicle progresses, the error in measuring the rotation angle of the wheel increases, degrading the driver's steering feeling and steering stability.

Therefore, the need for research to minimize the error between the driver's steering wheel rotation angle and the actual rotation angle of the road wheel and to maintain the driver's steering feel and steering stability even as the vehicle's durability progresses is emerging.

SUMMARY OF THE DISCLOSURE

Embodiments of the present disclosure provide a steer by wire type steering apparatus that can increase the driver's steering feeling and steering safety by accurately measuring the rotation angle of the wheel and controlling the steering.

And embodiments of the present disclosure provide a steer by wire type steering apparatus that can increase the steering feeling and steering stability of the driver by reducing the error in measuring the rotation angle of the road wheel even in the state of durability.

In addition, the purpose of the embodiments of the present disclosure are not limited thereto, and other objects not mentioned will be clearly understood by those skilled in the art from the following description.

A steer by wire type steering apparatus according to the embodiments of the present disclosure may comprise an input shaft having one end coupled to a reducer and having an input gear formed on an outer circumferential surface of another end to transmit driving force of a motor, an output shaft having an output gear coupled to the input gear formed on one side of an outer circumferential surface, a first gear coupled to one end, and a pitman arm coupled to another end, a sensor shaft having one end coupled to a second gear coupled to the first gear, and an angle sensor coupled to an outer circumferential surface of the sensor shaft to detect a rotational angle of the sensor shaft and transmit the rotational angle of the sensor shaft to an electronic control device.

And a steer by wire type steering apparatus according to the embodiments of the present disclosure may comprise an input shaft having one end coupled to a reducer and having an input gear formed on an outer circumferential surface of another end to transmit driving force of a motor, an output shaft having an output gear coupled to the input gear formed on one side of an outer circumferential surface, a first pulley coupled to one end, and a pitman arm coupled to another end, a sensor shaft having one end coupled to a second pulley coupled to the first pulley by a belt, and an angle sensor coupled to an outer circumferential surface of the sensor shaft to detect a rotational angle of the sensor shaft and transmit the rotational angle of the sensor shaft to an electronic control device.

According to the embodiments of the present disclosure, there is provided a steer by wire type steering apparatus that can increase the driver's steering feeling and steering safety by accurately measuring the rotation angle of the wheel and controlling the steering.

In addition, according to the embodiments of the present disclosure, there is provided a steer by wire type steering apparatus that can increase the steering feeling and steering stability of the driver by reducing the error in measuring the rotation angle of the road wheel even in the state of durability.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 1:
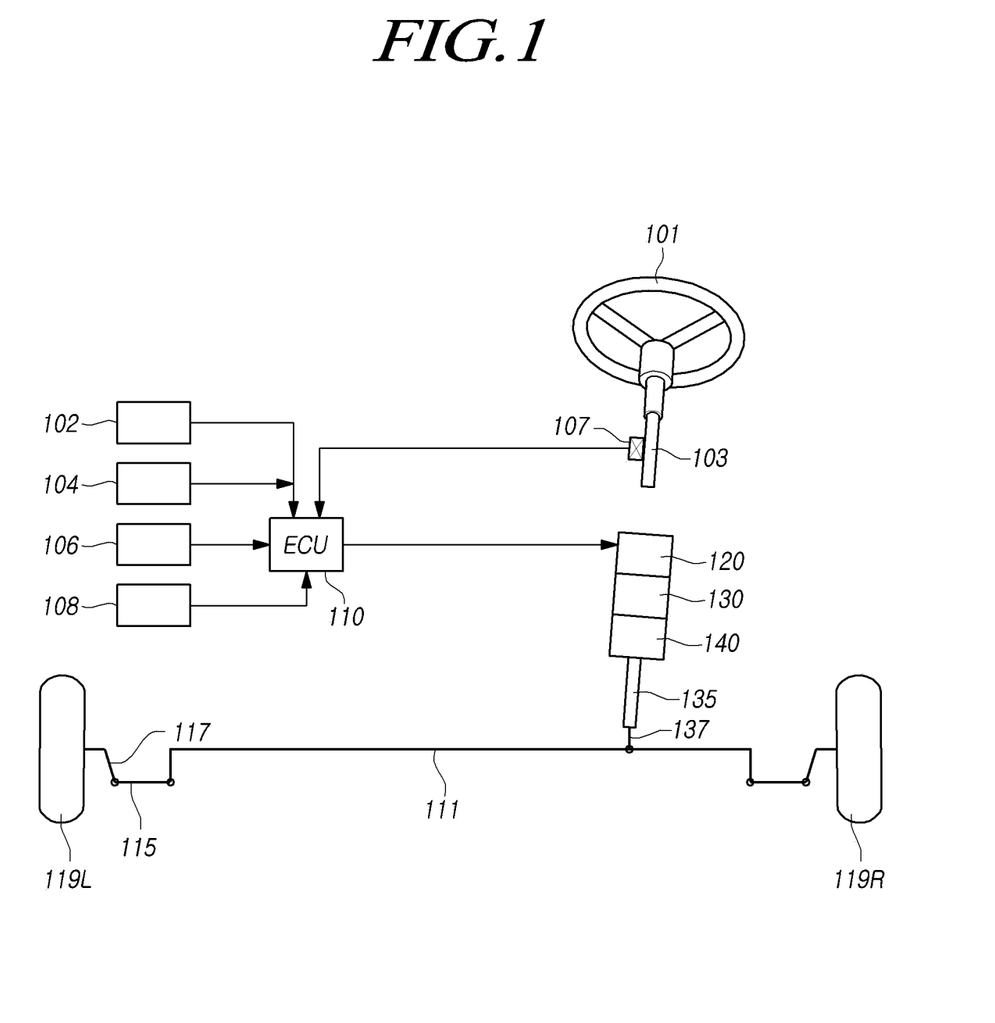
FIG. 1 is a schematic view illustrating a steer by wire type steering apparatus according to the embodiments of the present disclosure.
Figure 2:
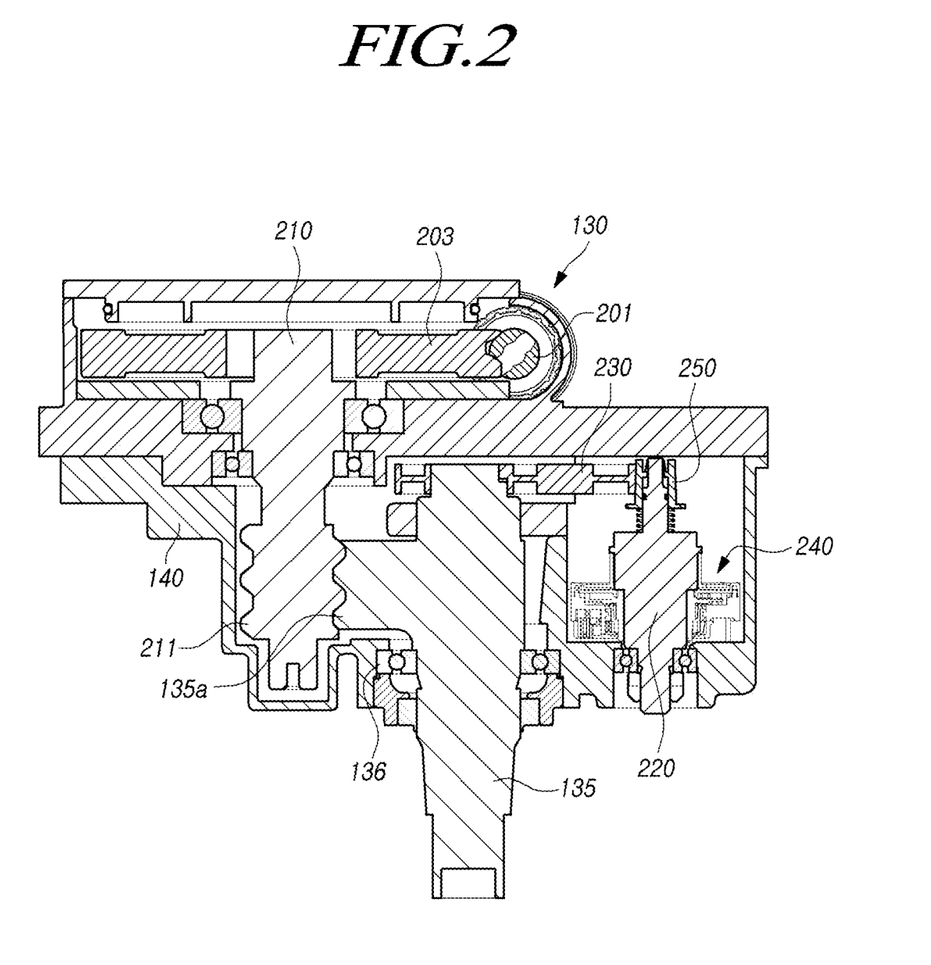
FIG. 2 is a cross-sectional view illustrating a steer by wire type steering apparatus according to the embodiments of the present disclosure.
Figure 3:
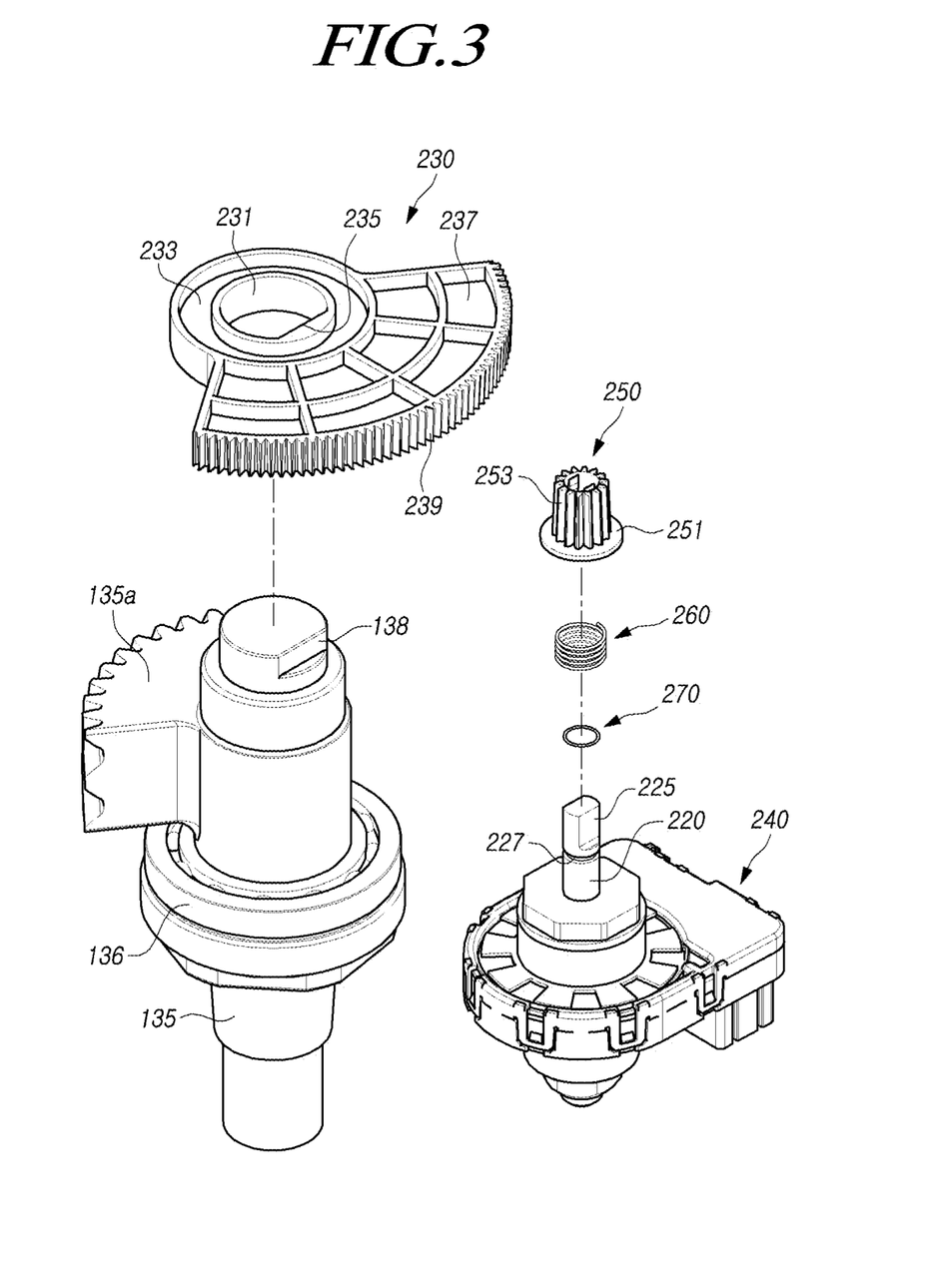
FIGS. 3 and 4 are perspective views illustrating a steer by wire type steering apparatus according to the embodiments of the present disclosure.
Figure 4:
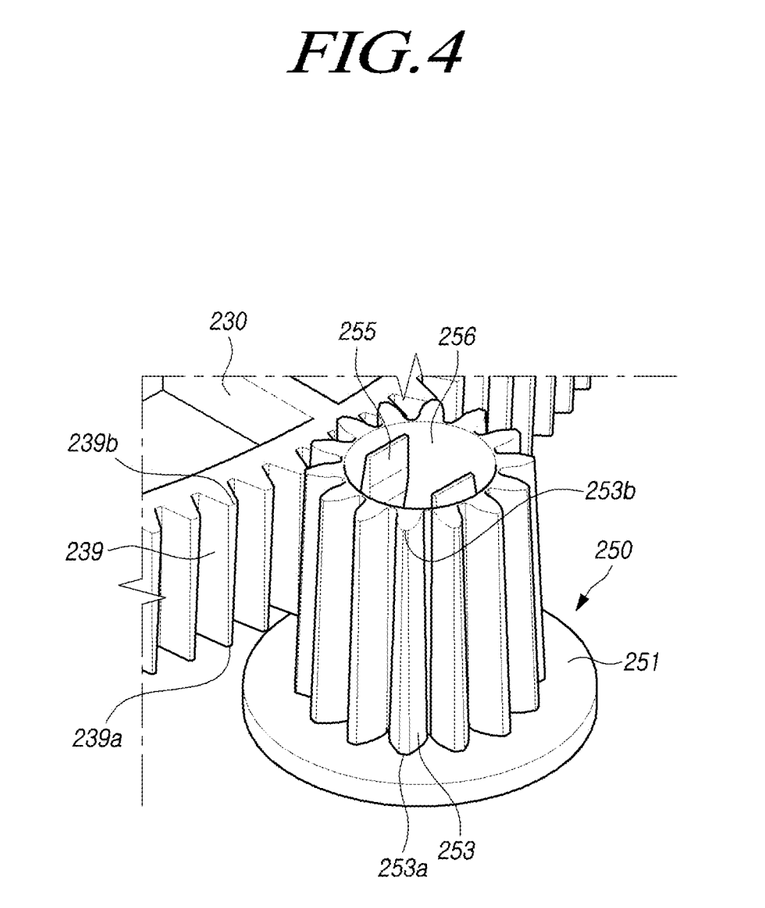
Figure 5:
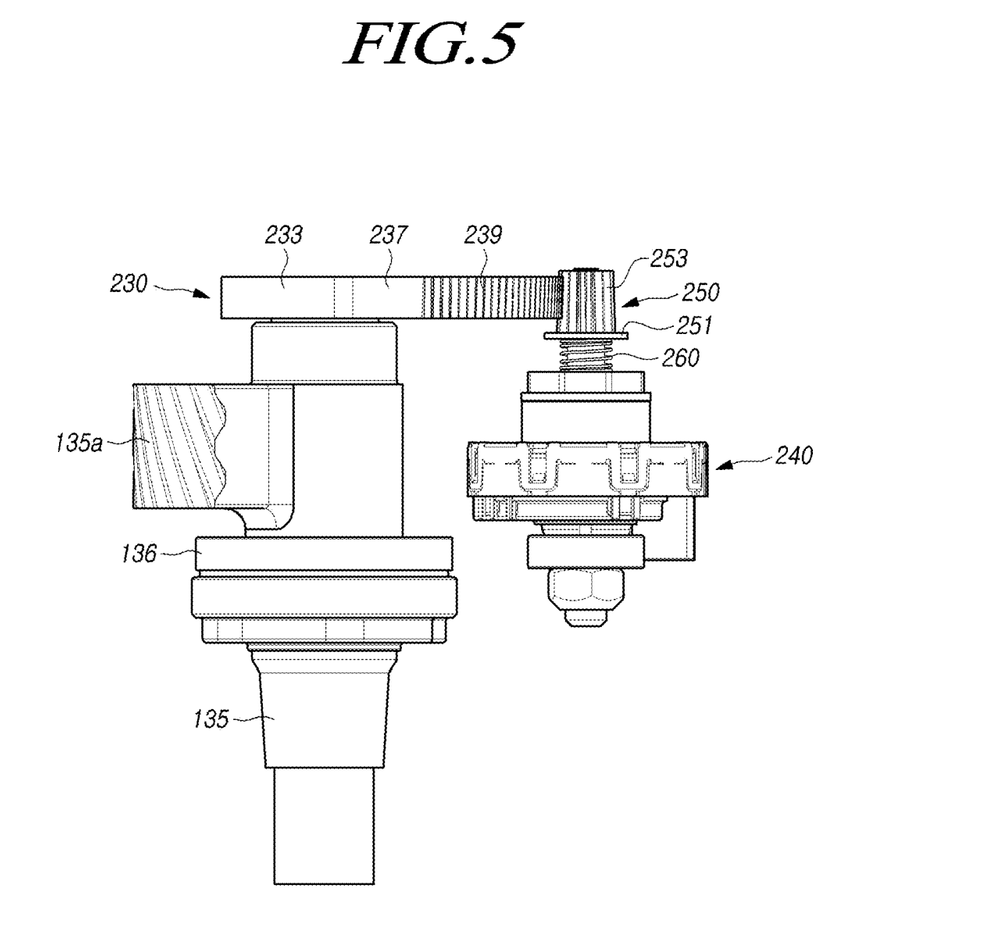
FIG. 5 is a front view illustrating a steer by wire type steering apparatus according to the embodiments of the present disclosure.
Figure 6:
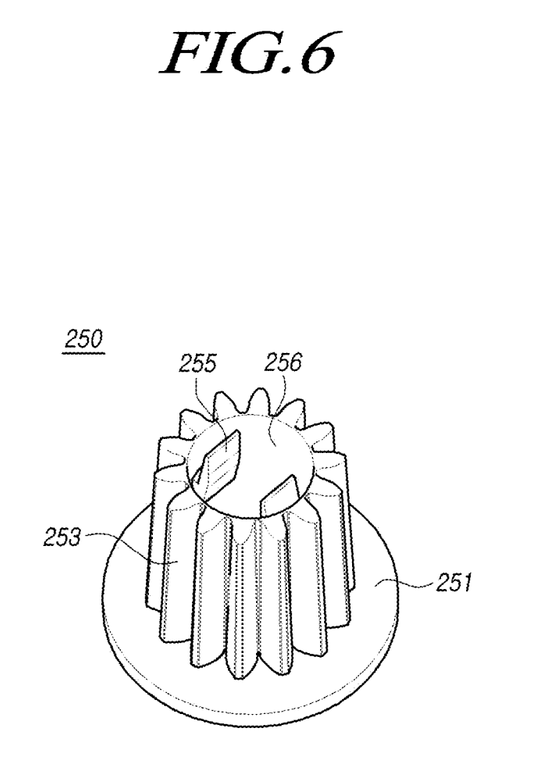
FIG. 6 is a perspective view illustrating a steer by wire type steering apparatus according to the embodiments of the present disclosure.
Figure 7:
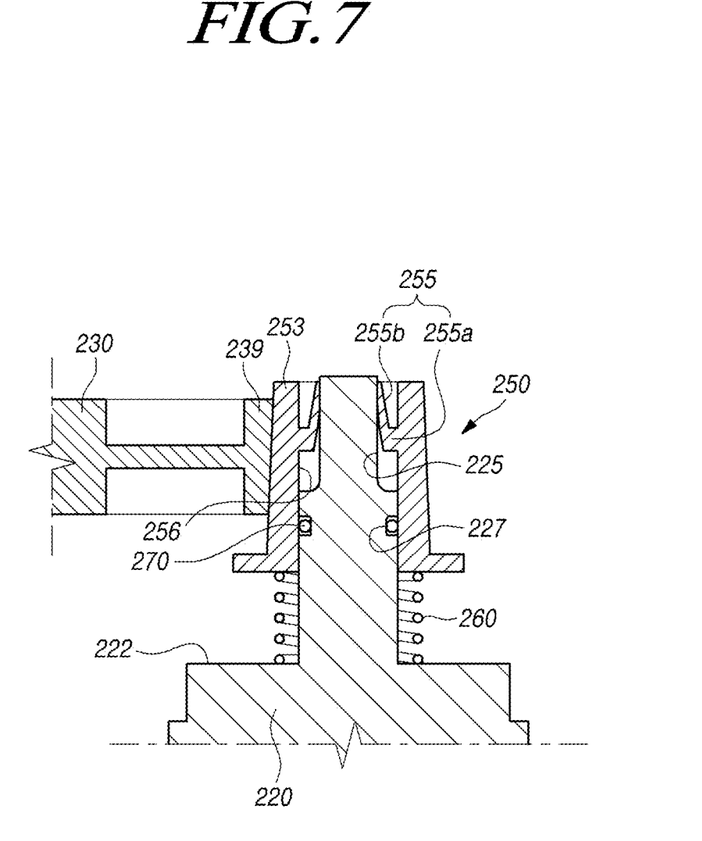
FIGS. 7 and 8 are cross-sectional views illustrating a steer by wire type steering apparatus according to the embodiments of the present disclosure.
Figure 8:
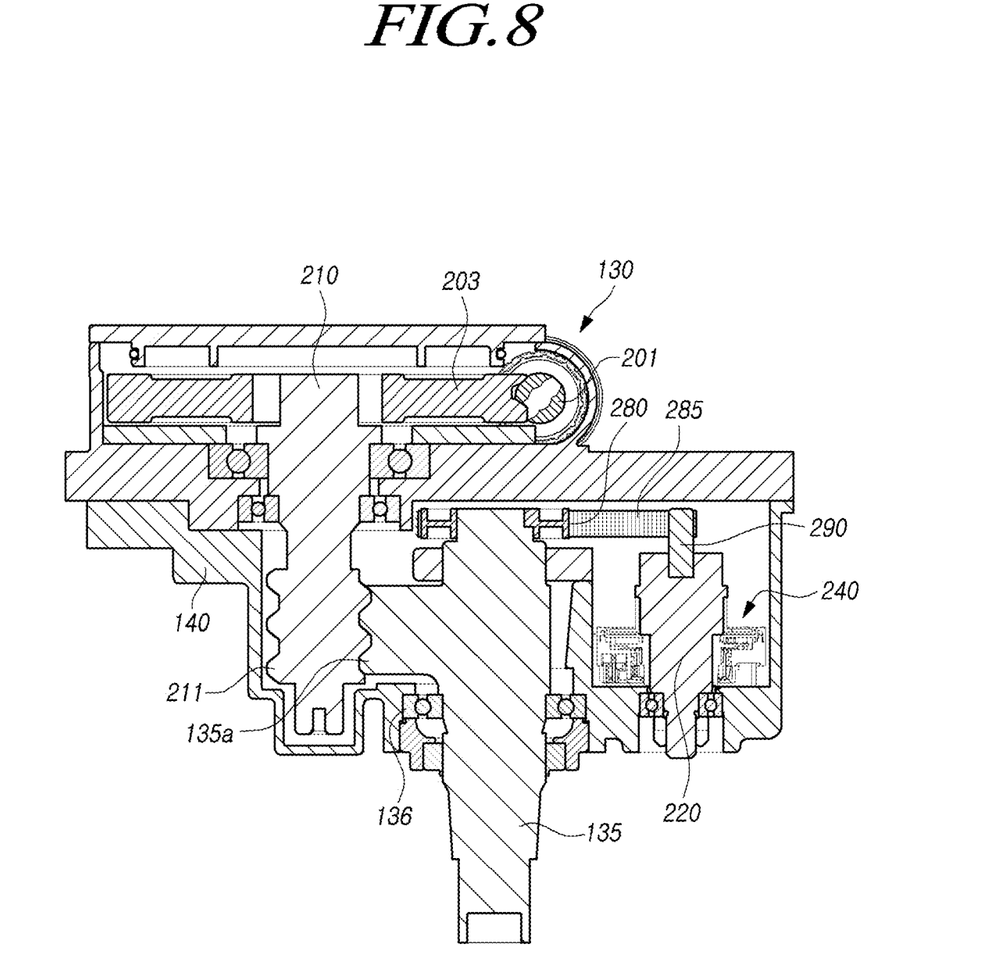
Figure 9:
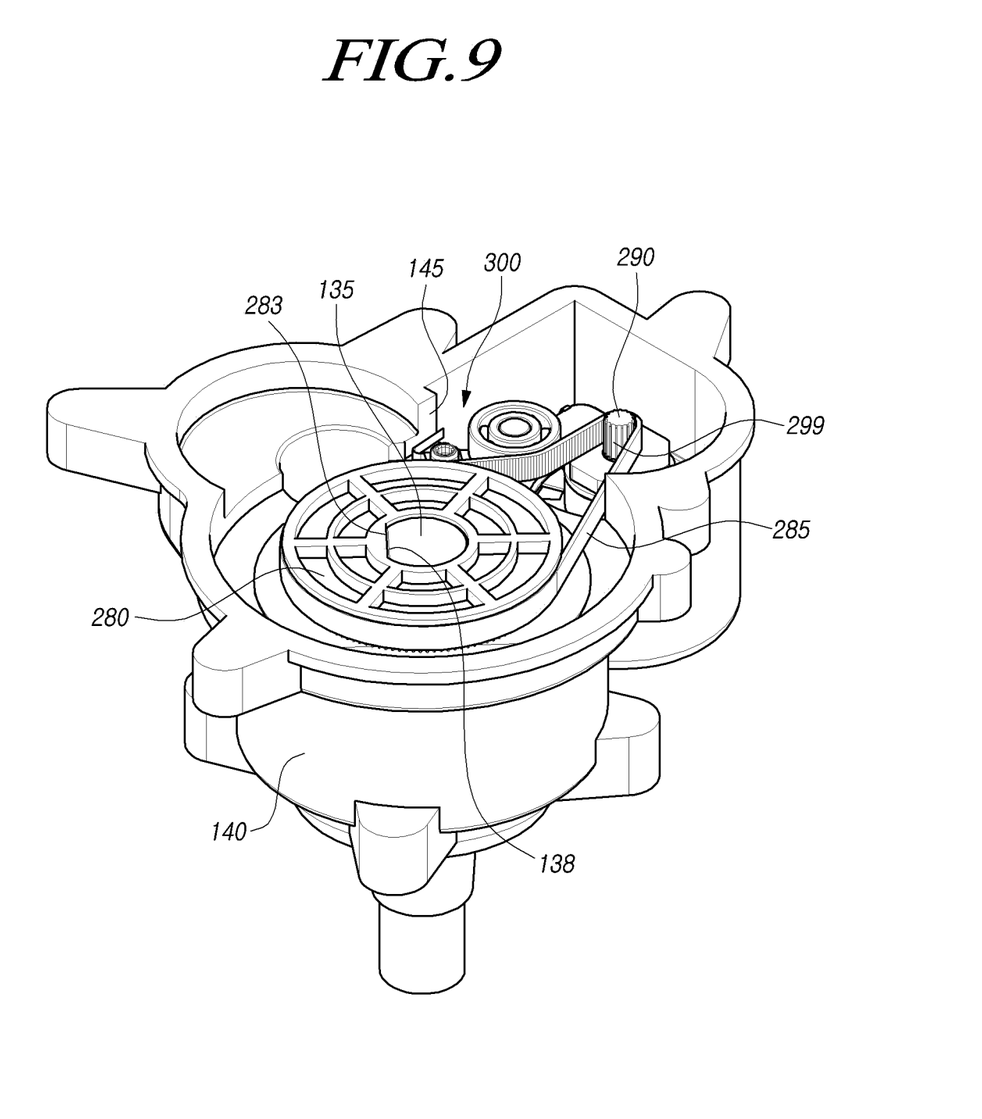
FIGS. 9 to 11 are perspective views illustrating a steer by wire type steering apparatus according to the embodiments of the present disclosure.
Figure 10:
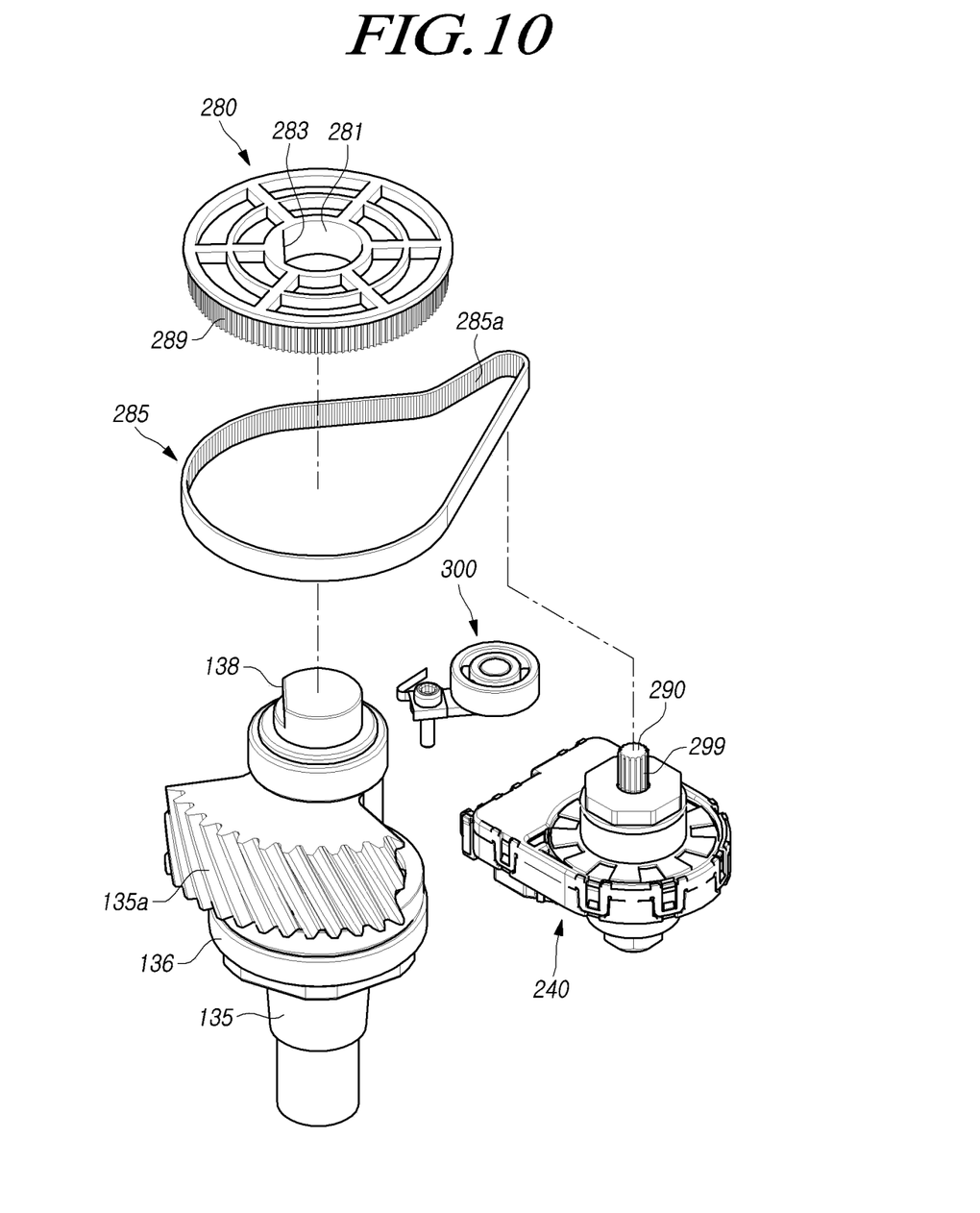
Figure 11:
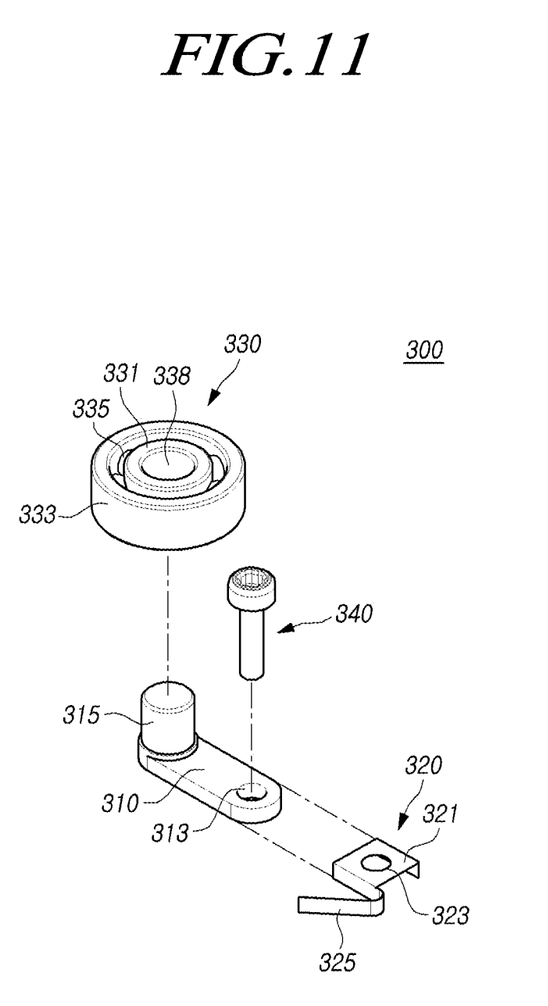

FIG. 1 is a schematic view illustrating a steer by wire type steering apparatus according to the embodiments of the present disclosure, FIG. 2 is a cross-sectional view illustrating a steer by wire type steering apparatus according to the embodiments of the present disclosure, FIGS. 3 and 4 are perspective views illustrating a steer by wire type steering apparatus according to the embodiments of the present disclosure, FIG. 5 is a front view illustrating a steer by wire type steering apparatus according to the embodiments of the present disclosure, FIG. 6 is a perspective view illustrating a steer by wire type steering apparatus according to the embodiments of the present disclosure, FIGS. 7 and 8 are cross-sectional views illustrating a steer by wire type steering apparatus according to the embodiments of the present disclosure, FIGS. 9 to 11 are perspective views illustrating a steer by wire type steering apparatus according to the embodiments of the present disclosure.

Referring to FIGS. 1 to 11, a steer by wire type steering apparatus according to the embodiments of the present disclosure may include an input shaft 210 having one end coupled to a reducer 130 and having an input gear 211 formed on an outer circumferential surface of another end to transmit driving force of a motor 120, an output shaft 135 having an output gear 135*a* coupled to the input gear 211 formed on one side of an outer circumferential surface, a first gear 230 coupled to one end, and a pitman arm 137 coupled to another end, a sensor shaft 220 having one end coupled to a second gear 250 coupled to the first gear 230, and an angle sensor 240 coupled to an outer circumferential surface of the sensor shaft 220 to detect a rotational angle of the sensor shaft 220 and transmit the rotational angle of the sensor shaft to an electronic control device 110.

In addition, a steer by wire type steering apparatus according to the embodiments of the present disclosure may include an input shaft 210 having one end coupled to a reducer 130 and having an input gear 211 formed on an outer circumferential surface of another end to transmit driving force of a motor 120, an output shaft 135 having an output gear 135*a* coupled to the input gear 211 formed on one side of an outer circumferential surface, a first pulley 280 coupled to one end, and a pitman arm 137 coupled to another end, a sensor shaft 220 having one end coupled to a second pulley 290 coupled to the first pulley 280 by a belt, and an angle sensor 240 coupled to an outer circumferential surface of the sensor shaft 220 to detect a rotational angle of the sensor shaft 220 and transmit the rotational angle of the sensor shaft to an electronic control device 110.

First, referring to FIG. 1, in the steer by wire type steering apparatus according to embodiments of the present disclosure, a torque sensor 107 is provided on the steering shaft 103 connected to the steering wheel 101, and the torque sensor 107 detecting when the driver operates the steering wheel 101 transmits an electric signal to the electronic control device 110 and the electronic control device 110 transmits the operation signal value to the motor 120.

The electronic controller 110 controls the operating current value of the motor 120 based on electrical signals transmitted from the torque sensor 107 and the electrical signals transmitted from various sensors such as vehicle speed sensor 102, yaw rate sensor 104, acceleration sensor 106, and camera image sensor 108 mounted on the vehicle.

The motor 120 is connected to a reducer 130 that reduces the number of revolutions of the motor, during normal driving, the electronic control device 110 provides steering reaction force according to the driver's manipulation of the steering wheel 101. And during autonomous driving, steering is performed under the control of the electronic control device 110 based on electrical signals transmitted from the various sensors described above regardless of the driver's will.

In these embodiments, the driving force and rotation direction of the motor 120 are controlled according to the signal value received from the electronic control device 110, and by operating the pitman arm 137 connected to the output shaft 135, steering of both road wheels 119L and 119R is performed through the links 111, 115, and 117 connected to the pitman arm 137.

In addition, an angle sensor 240 is provided to measure the actual steering angle of the vehicle, that is, the rotational position of the wheel, and transmits the actual steering angle of the vehicle to the electronic control device 110.

In the drawings in the embodiments of the present disclosure, for convenience of explanation, the torque sensor 107, an angle sensor 240, a vehicle speed sensor 102, a yaw rate sensor 104, an acceleration sensor 106, and a camera image sensor 108 are briefly illustrated as an example, but a motor position sensor for transmitting steering information to the electronic control device 110 and various radars, lidars, and the like may be provided, and a detailed description thereof will be omitted below.

The driving force of the motor 120 driven according to the signal value received from the electronic control device 110 rotates the input shaft 210 through the reduction gear 130, the input shaft 210 transmits the driving force of the motor 120 to the output shaft 135.

An input gear 211 is formed on the outer circumferential surface of the input shaft 210 and is coupled with the output gear 135a of the output shaft 135, when the input shaft 210 rotates, the output shaft 135 is interlocked and rotated.

An output gear 135a coupled to the input gear 211 is formed on one side of the outer circumferential surface of the output shaft 135, and a first gear 230 is coupled to one end of the output shaft 135. Therefore, when the output shaft 135 is rotated by being coupled with the second gear 250 of the sensor shaft 220, the sensor shaft 220 is interlocked and rotated.

A pitman arm 137 is coupled to an end of the output shaft 135, so that both road wheels 119L and 119R are steered through links 111, 115, and 117 connected to the pitman arm 137.

The sensor shaft 220 has a second gear 250 coupled to the first gear 230 of the output shaft 135 at one end and rotates in conjunction with the rotation of the output shaft 135, and the sensor shaft 220 provides the rotation angle of the output shaft 135 to the angle sensor 240.

The angle sensor 240 is coupled to the outer circumferential surface of the sensor shaft 220, detects the rotation angle of the sensor shaft 220, and sends it to the electronic control device.

Here, the first gear 230 coupled to one end of the output shaft 135 includes an end coupling portion 233 formed in a ring shape having a first insertion hole 231 into which one end of the output shaft 135 is inserted, and a gear portion 237 formed in a circle sector shape connected to an outer circumferential surface of the end coupling portion 233 and having first gear teeth 239 on an outer circumferential surface.

The second gear 250 coupled to one end of the sensor shaft 220 is formed in a ring shape having a second insertion hole 256 into which one end of the sensor shaft 220 is inserted, and has second gear teeth 253 engaged with the first gear teeth 239 on an outer circumferential surface thereof.

The outer circumferential diameter of the second gear 250 is formed to decrease from the lower end to the upper end of the second gear 250, and the second gear teeth 253 formed in the axial direction are formed so that the thickness decreases from a lower end 253a of the second gear teeth 253 toward an upper end 235b of the second gear teeth 253.

First gear teeth 239 are formed on the outer circumferential surface of the gear portion 237. The first gear teeth 239 increase in thickness from a lower end to an upper end of the first gear teeth 239.

In addition, the first gear teeth 239 have a thickness increasing from the lower end 239a to the upper end 239b of the first gear tooth 239, and the second gear teeth 253 decrease in thickness from a lower end to an upper end of the second gear teeth 253.

That is, the first gear teeth 239 and the second gear teeth 253 are formed to be coupled at the central portion in the axial direction. Therefore when the first gear teeth 239 and the second gear teeth 253 are worn after the durability progresses, the second gear 250 moves in the axial direction by the elastic member 260, the gap between the first gear teeth 239 and the second gear teeth 253 is compensated.

And, a first recessed surface 138 is formed on the outer circumferential surface of one end of the output shaft 135, a first protruding surface 235 in close contact with the first recessed surface 138 is formed on the inner circumferential surface of the first insertion hole 231 of the first gear 230. Therefore, slipping or separation is prevented while the first gear 230 is coupled to the output shaft 135.

And a second recessed surface 225 is formed on the outer circumferential surface of one end of the sensor shaft 220. An elastic protrusion 255 is formed on an inner circumferential surface of the second insertion hole 256, and the elastic protrusion 255 adheres to the second recessed surface 225 and is elastically deformed.

The elastic protrusion 255 includes a connecting portion 255a protruding in a radial direction from an inner circumferential surface of the second insertion hole 256, and a support portion 255b extending in an axial direction of the sensor shaft 220 from the connecting portion 255a and spaced apart from an inner circumferential surface of the second insertion hole 256.

These present embodiments further include an elastic member 260 supported by a stepped portion 222 of the sensor shaft 220 and elastically supporting the second gear 250 toward the axial end.

In addition, a support end 251 protruding radially from the outer circumferential surface is formed at the lower end of the second gear 250 so that the elastic member 260 supports the support end 251 in the axial direction and does not escape.

These present embodiments further include a housing 140 in which the input shaft 210, the output shaft 135, the sensor shaft 220, and the angle sensor 240 are embedded.

Also, referring to FIGS. 8 to 11, the steer by wire type steering apparatus according to the present embodiments includes an input shaft 210 having one end coupled to a reducer 130 and having an input gear 211 formed on an outer circumferential surface of another end to transmit driving force of a motor 120, an output shaft 135 having an output gear 135a coupled to the input gear 211 formed on one side of an outer circumferential surface, a first pulley 280 coupled to one end, and a pitman arm 137 coupled to another end, a sensor shaft 220 having one end coupled to a second pulley 290 coupled to the first pulley 280 by a belt 285, and an angle sensor 240 coupled to an outer circumferential surface of the sensor shaft 220 to detect a rotational angle of the sensor shaft 220 and transmit the rotational angle of the sensor shaft to an electronic control device 110.

Axial pulley serrations 289 and 299 are formed on the outer circumferential surfaces of the first pulley 280 and the second pulley 290, and belt serrations 285a engaged with pulley serrations 289 and 299 of the first pulley 280 and the second pulley 290 are formed on the inner circumferential surface of the belt 285.

And, a first recessed surface 138 is formed on the outer circumferential surface of one end of the output shaft 135, the first pulley 280 has a first protruding surface 283 in close contact with the first recessed surface 138 formed on the inner circumferential surface of a coupling hole 281 into which the output shaft 135 is inserted. Therefore, slip or separation is prevented in a state in which the first pulley 280 is coupled to one end of the output shaft 135.

These present embodiments further include a housing 140 in which the input shaft 210, the output shaft 135, the sensor shaft 220, and the angle sensor 240 are embedded. The housing 140 is provided with a belt support member 300 for supporting the outer circumferential surface of the belt 285 inwardly. Therefore it is possible to prevent the belt 285 from being separated or loosened by the first pulley 280 and the second pulley 290 after the durability is progressed.

The belt support member 300 includes a connecting member 310 having one end coupled rotatably to the housing 140, a support member 330 coupled rotatably to another end of the connecting member 310 to support an outer circumferential surface of the belt 285, and an elastic support portion 325 including a body 321 coupled to one end of the connecting member 310, bent and extended from the body 321, and elastically supported by the housing 140.

A rotation support hole 313 is formed at one end of the connecting member 310 and is coupled rotatably to the fastening member 340 fastened to the housing 140. A protruding shaft 315 to which the support member 330 is coupled rotatably is formed at the other end of the connecting member 310.

A ball 335 is coupled between the inner ring 331 and the outer ring 333 of the support member 330, and the protruding shaft 315 is coupled to the center hole 338 of the inner ring 331. When the belt 285 is operated, the outer ring 333 rotates to support the outer circumferential surface of the belt 285.

The elastic support part 325 elastically supports the connection member 310 to apply force to rotate the support member 330 toward the belt 285. A communication hole 323 is formed in the main body 321 coupled to one end of the connecting member 310, so that it is supported by the fastening member 340 and coupled rotatably with the connecting member 310.

The main body 321 is formed in a shape that surrounds the top and both sides of one end of the connecting member 310. The elastic support portion 325 is bent outward from the side end of the body 321 and extended to be elastically supported by the inner partition wall 145 of the housing 140. The elastic support portion 325 elastically supports the connection member 310 and the support member 330 toward the belt 285.

Therefore, as the belt support member 300 elastically supported by the housing 140 supports the belt 285 inwardly, the belt 285 is prevented from being separated or loosened from the first pulley 280 and the second pulley 290.

As described above, according to the embodiments of the present disclosure, there is provided a steer by wire type steering apparatus that can increase the driver's steering feeling and steering safety by accurately measuring the rotation angle of the wheel and controlling the steering.

In addition, according to the embodiments of the present disclosure, there is provided a steer by wire type steering apparatus that can increase the steering feeling and steering stability of the driver by reducing the error in measuring the rotation angle of the road wheel even in the state of durability.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steer by wire type steering apparatus comprising:
   an input shaft having one end coupled to a reducer and having an input gear formed on an outer circumferential surface of another end to transmit driving force of a motor;
   an output shaft having an output gear coupled to the input gear formed on one side of an outer circumferential surface, a first gear coupled to one end, and a pitman arm coupled to another end;
   a sensor shaft having one end coupled to a second gear coupled to the first gear; and
   an angle sensor coupled to an outer circumferential surface of the sensor shaft to detect a rotational angle of the sensor shaft and transmit the rotational angle of the sensor shaft to an electronic control device.

2. The steer by wire type steering apparatus of claim 1, wherein the first gear comprises:
   an end coupling portion formed in a ring shape having a first insertion hole into which one end of the output shaft is inserted; and
   a gear portion formed in a circle sector shape connected to an outer circumferential surface of the end coupling portion and having first gear teeth on an outer circumferential surface.

3. The steer by wire type steering apparatus of claim 2, wherein the second gear formed in a ring shape having a second insertion hole into which one end of the sensor shaft is inserted, and having second gear teeth engaged with the first gear teeth on an outer circumferential surface thereof.

4. The steer by wire type steering apparatus of claim 3, wherein an outer circumferential diameter of the second gear decreases from a lower end to an upper end of the second gear.

5. The steer by wire type steering apparatus of claim 4, wherein a thickness of the second gear teeth decreases from a lower end toward an upper end of the second gear.

6. The steer by wire type steering apparatus of claim 5, wherein the first gear teeth increase in thickness from a lower end to an upper end of the first gear teeth.

7. The steer by wire type steering apparatus of claim 4, wherein the first gear teeth increase in thickness from a lower end to an upper end of the first gear teeth, and the second gear teeth decrease in thickness from a lower end to an upper end of the second gear teeth.

8. The steer by wire type steering apparatus of claim 2, wherein a first recessed surface is formed on an outer circumferential surface of one end of the output shaft.

9. The steer by wire type steering apparatus of claim 8, wherein a first protruding surface in close contact with the first recessed surface is formed on an inner circumferential surface of the first insertion hole.

10. The steer by wire type steering apparatus of claim 3, wherein a second recessed surface is formed on an outer circumferential surface of one end of the sensor shaft.

11. The steer by wire type steering apparatus of claim 10, wherein an elastic protrusion is formed on an inner circumferential surface of the second insertion hole, and the elastic protrusion adheres to the second recessed surface and is elastically deformed.

12. The steer by wire type steering apparatus of claim 11, wherein the elastic protrusion comprises:
   a connecting portion protruding in a radial direction from an inner circumferential surface of the second insertion hole; and
   a support portion extending in an axial direction of the sensor shaft from the connecting portion and spaced apart from an inner circumferential surface of the second insertion hole.

13. The steer by wire type steering apparatus of claim 1, wherein further comprises an elastic member supported by a stepped portion of the sensor shaft and elastically supporting the second gear toward an axial end.

14. The steer by wire type steering apparatus of claim 13, wherein a support end protruding in a radial direction from an outer circumferential surface is formed at a lower end of the second gear.

15. A steer by wire type steering apparatus comprising:
   an input shaft having one end coupled to a reducer and having an input gear formed on an outer circumferential surface of another end to transmit driving force of a motor;
   an output shaft having an output gear coupled to the input gear formed on one side of an outer circumferential surface, a first pulley coupled to one end, and a pitman arm coupled to another end;
   a sensor shaft having one end coupled to a second pulley coupled to the first pulley by a belt; and
   an angle sensor coupled to an outer circumferential surface of the sensor shaft to detect a rotational angle of the sensor shaft and transmit the rotational angle of the sensor shaft to an electronic control device.

16. The steer by wire type steering apparatus of claim 15, wherein an axial pulley serration is formed on outer circumferential surfaces of the first pulley and the second pulley, and a belt serration engaged with the pulley serration is formed on an inner circumferential surface of the belt.

17. The steer by wire type steering apparatus of claim 16, wherein a first recessed surface is formed on an outer circumferential surface of one end of the output shaft.

18. The steer by wire type steering apparatus of claim 17, wherein the first pulley has a first protruding surface in close contact with the first recessed surface formed on an inner circumferential surface of a coupling hole into which the output shaft is inserted.

19. The steer by wire type steering apparatus of claim 16, wherein further comprises a housing in which the input shaft, the output shaft, the sensor shaft, and the angle sensor are embedded, and the housing is provided with a belt support member for supporting an outer circumferential surface of the belt inwardly.

20. The steer by wire type steering apparatus of claim 19, wherein the belt support member comprises:
   a connecting member having one end coupled rotatably to the housing;
   a support member coupled rotatably to an other end of the connecting member to support an outer circumferential surface of the belt; and
   an elastic support portion including a body coupled to one end of the connecting member, bent and extended from the body, and elastically supported by the housing.

* * * * *